UNITED STATES PATENT OFFICE.

L. O. COLVIN, OF PHILADELPHIA, PENNSYLVANIA.

IMPROVEMENT IN COW-MILKERS.

Specification forming part of Letters Patent No. 46,994, dated March 28, 1865.

*To all whom it may concern:*

Be it known that I, L. O. COLVIN, of Philadelphia, in the county of Philadelphia and State of Pennsylvania, have invented a new and Improved Cow-Milker; and I do hereby declare that the following is a full, clear, and exact description thereof, which will enable those skilled in the art to make and use the same, reference being had to the accompanying drawings, forming part of this specification, in which—

Figure 1 is a plan or top view of my invention, the teat-tubes being in section, as indicated by the line $x$ $x$, Fig. 3; Fig. 2, an inverted plan of the same, or bottom view; Fig. 3, a vertical section of the same taken in the line $x$ $x$, Fig. 2.

Similar letters of reference indicate corresponding parts.

This invention consists in constructing a cow-milking device with a plurality of pumps, one for each teat of the cow, and having said pumps operated simultaneously by a single lever, but each pump operating independently of the others, whereby the cow may be thoroughly milked from each teat, or, in other words, each teat milked completely dry.

The cow-milkers hitherto devised have been, so far as I am aware, provided with but a single pump, to act upon and draw the milk from the four teats of a cow, and when one or more teats become dry before the others the former fail to fill the teat tubes, owing to their shrunken condition, and admit air into the pump, which renders the latter inoperative and precludes the milk being extracted from the teats which are not yet dry. My invention is designed to obviate this difficulty and at the same time render the device equally as efficient in its operation as those previously constructed.

A represents a milk-receptacle which is of flat quadrilateral form and is provided with a discharge-spout, B, to serve as a handle to hold the machine in proper position while being operated. At each corner or angle of the milk-receptacle A there is an inverted conical chamber, C, to which the teat-tubes D are attached. These teat-tubes may be constructed in any proper manner, but india-rubber will probably be the material used with a spiral wire fitted within them.

The teat-tubes do not communicate with the chambers C by an open passage. A valve, E, is interposed between them, opening downward into the chambers. These valves serve as checks, and may be termed check-valves, as they prevent the milk being forced back into the tubes after being drawn into the chambers C. Each valve E has a small hole, $a$, made in it, as shown in Fig. 3, the object of which will be presently stated.

The chambers C are each provided with a piston or valve, F, constructed of india-rubber or other suitable flexible material, and of a form corresponding to the interiors of the chambers C. These valves are provided at their edges with a ring of hard rubber, $b$, which is fitted within lugs $c$ at the lower edges of the chambers, and each piston or valve F has a rod, G, attached centrally to it, said rods projecting downward and fitting in slots in arms H, which project from a head, I, on a pivot, J, the latter being at the center of the under side of the milk-receptacle A and the head I allowed to turn freely upon it.

One of the arms H is prolonged and has a handle, K, upon it.

Each chamber C communicates with the milk-receptacle A by means of an opening, $d$.

The device is held to its work by grasping the spout B, a teat being inserted in each tube, D, and the handle K is moved or vibrated laterally, which works the pistons or valves F, the latter operating simultaneously but independently of each other. The milk is forced into the receptacle A, and passes therefrom through the spout B into the pail prepared to receive it.

By this arrangement it will be seen that in case either teat becomes dry and detached from its tube D, the operation of the pumps on the other teats will not be affected thereby, as one teat may be operated upon equally as well as the whole. My invention therefore admits of all the teats of a cow being milked perfectly dry.

By having the valves E perforated with a hole, $a$, the action of the pumps are made more continuous than they otherwise would be. The teats are also allowed to withdraw from the tubes D and the latter still made to hug the teats sufficiently to cause the necessary degree of suction to be produced.

I claim as new and desire to secure by Letters Patent—

L. O. COLVIN.
Cow Milker.
No. 46,994. Patented March 28, 1865.
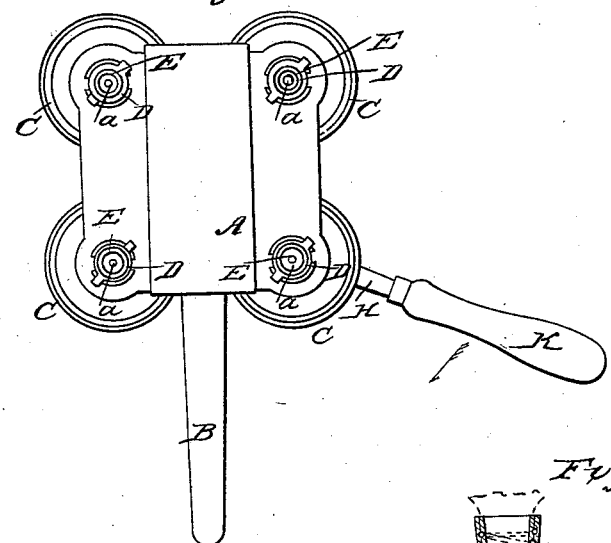
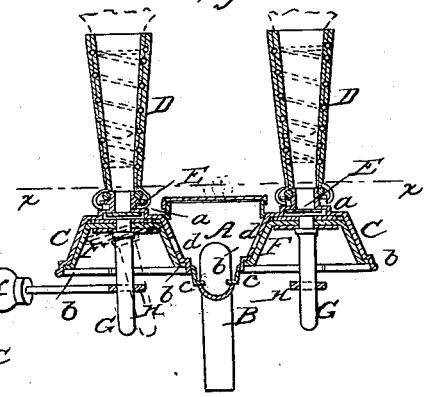
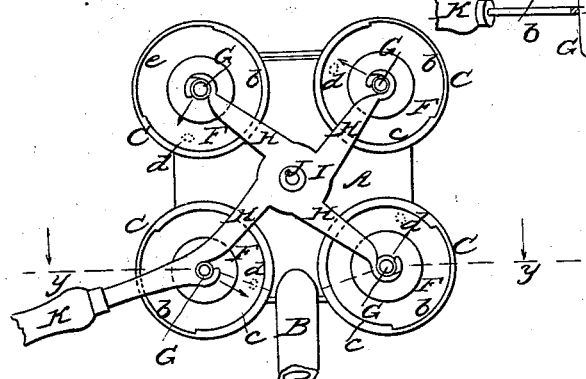
Witnesses:
James P. Hall.
Henry Morris.
Inventor:
L. O. Colvin
per Munn & Co
attorneys